(12) United States Patent
Walker (10) Patent No.: US 11,450,170 B2
(45) Date of Patent: Sep. 20, 2022

(54) DISPOSABLE INFLATABLE MATTRESS AND DEVICE FOR DISPENSING SAME

(71) Applicant: Traci D. Walker, Memphis, TN (US)

(72) Inventor: Traci D. Walker, Memphis, TN (US)

( * ) Notice: Subject to any disclaimer, the term of this patent is extended or adjusted under 35 U.S.C. 154(b) by 278 days.

(21) Appl. No.: 16/833,765

(22) Filed: Mar. 30, 2020

(65) Prior Publication Data

US 2021/0304549 A1    Sep. 30, 2021

(51) Int. Cl.
| | | |
|---|---|---|
| G07F 11/72 | (2006.01) | |
| G05B 19/042 | (2006.01) | |
| G06Q 20/34 | (2012.01) | |
| G06Q 20/18 | (2012.01) | |
| G06Q 20/32 | (2012.01) | |
| G07F 9/00 | (2006.01) | |
| G07F 11/16 | (2006.01) | |
| A47C 27/08 | (2006.01) | |

(52) U.S. Cl.
CPC ............ *G07F 11/72* (2013.01); *A47C 27/081* (2013.01); *G05B 19/042* (2013.01); *G06Q 20/18* (2013.01); *G06Q 20/3278* (2013.01); *G06Q 20/34* (2013.01); *G07F 9/001* (2020.05); *G07F 9/002* (2020.05); *G07F 11/165* (2013.01); *G05B 2219/25425* (2013.01)

(58) Field of Classification Search
CPC .... G07F 11/1653; G07F 11/165; G07F 9/002; G07F 9/001; A47C 27/081; A47C 27/082; A47C 27/084
USPC ...................................................... 5/706, 710
See application file for complete search history.

(56) References Cited

U.S. PATENT DOCUMENTS

| | | | | | |
|---|---|---|---|---|---|
| 4,541,136 | A | * | 9/1985 | Graebe ................ | A47C 27/081 5/655.3 |
| 5,568,663 | A | * | 10/1996 | Brown ..................... | A61G 1/00 5/413 AM |
| 5,590,428 | A | * | 1/1997 | Roter ................... | A47C 27/081 297/180.13 |
| 5,638,565 | A | * | 6/1997 | Pekar ................... | B65D 81/052 5/710 |
| 5,890,245 | A | * | 4/1999 | Klearman .......... | A61G 7/05769 5/710 |
| 5,901,393 | A | * | 5/1999 | Pepe .................. | A61G 7/05776 5/713 |
| 10,872,489 | B1 | * | 12/2020 | Carter .................... | G07F 17/08 |
| 2007/0101506 | A1 | * | 5/2007 | Pirzada .............. | A61G 7/05776 5/713 |
| 2008/0270157 | A1 | * | 10/2008 | Read ..................... | G06Q 30/06 700/232 |

(Continued)

*Primary Examiner* — Timothy R Waggoner
(74) *Attorney, Agent, or Firm* — NK Patent Law (57) ABSTRACT

Automated vending system for dispensing disposable inflatable mattresses includes a kiosk for housing a plurality of mattress packages. Each mattress package includes a disposable inflatable mattress with an inflating means. The plurality of mattress packages is positioned in a storage rack within the kiosk. The system further includes a robotic mechanism configured to engage a first mattress package from the storage rack and deliver the first mattress package to a product delivery area of the kiosk. The system furthermore includes a user interface configured for receiving a user selection of the first mattress package, and a controller configured to command the robotic mechanism to select and deliver the first mattress package to the product delivery area.

20 Claims, 6 Drawing Sheets

(56) References Cited

U.S. PATENT DOCUMENTS

| | | | |
|---|---|---|---|
| 2010/0290931 A1* | 11/2010 | Sanders | F04B 33/00 417/374 |
| 2012/0079662 A1* | 4/2012 | Dzioba | A61G 7/05776 5/713 |
| 2018/0276602 A1* | 9/2018 | Rivalto | G07G 1/0036 |

* cited by examiner

DISPOSABLE INFLATABLE MATTRESS AND DEVICE FOR DISPENSING SAME

TECHNICAL FIELD

The present invention relates in general to mattresses. More particularly, the present invention relates to disposable inflatable mattresses, and to a system and related method for automated product dispensing of disposable inflatable mattresses.

BACKGROUND

When flight cancellations occur at an airport due to inclement weather, for example, travelers are often forced to sleep at the airport due to extended layover at the airport before the departure time of the flight to their next destination. Even in the absence of unexpected delays at the airport, travelers on transit may often need to sleep at the airport when there is a wide time gap between the arrival time of their previous flight and the departure time of their next flight. Airports are typically not equipped with enough lounge chairs to accommodate all travelers that may want to lie down to rest. Further, even in instances where empty lounge chairs may be available for resting, it is the case that an increasing number of travelers feel uncomfortable using such empty lounge chairs due to the concern of disease causing microbes being present is such lounge chairs, particularly given the high volume of passenger traffic encountered at airports.

There is thus a need for providing a cost effective and efficient solution for travelers looking for a means for resting comfortably in a hygiene manner at airports and similar other locations.

SUMMARY

This summary is provided to introduce in a simplified form concepts that are further described in the following detailed descriptions. This summary is not intended to identify key features or essential features of the claimed subject matter, nor is it to be construed as limiting the scope of the claimed subject matter.

Disclosed herein is an automated vending system and device for dispensing disposable inflatable mattresses. In various embodiments, the system or device comprises a kiosk for housing a plurality of mattress packages. Each mattress package includes a disposable inflatable mattress with an inflating means. The plurality of mattress packages is positioned in a storage rack within the kiosk. The system further comprises a robotic mechanism configured to engage a first mattress package from the storage rack and deliver the first mattress package to a product delivery area of the kiosk. The system furthermore comprises a user interface configured for receiving a user selection of the first mattress package. The system also comprises a controller configured to command the robotic mechanism to select and deliver the first mattress package to the product delivery area.

Disclosed herein is a server forming part of an automated vending system for disposable inflatable mattresses. In various embodiments, the server comprises a processor communicably coupled to at least one memory and program instructions. The program instructions when executed by the processor cause the processor to: receive, on a user interface of a vending kiosk, an order for a first mattress package by a user, wherein the kiosk is configured for housing a plurality of mattress packages, each mattress package including a disposable inflatable mattress with an inflating means, the plurality of mattress packages positioned in a storage rack within the kiosk. The server is further configured to locate position of a first mattress package in a storage rack within the kiosk, and direct a controller in communication with a robotic mechanism located within the kiosk to cause the robotic mechanism to engage the first mattress package at the storage rack and deliver the first mattress package to a product delivery area of the kiosk; and verify completion of the order.

Disclosed herein is a method for automated vending of disposable inflatable mattresses. In various embodiments, the method comprises receiving, receiving, on a user interface of a computing device, an order for a first mattress package by a user. The method further comprises locating position of the first mattress package in a storage rack within a vending kiosk, the kiosk configured for housing a plurality of mattress packages, each mattress package including a disposable inflatable mattress with an inflating means, the plurality of mattress packages positioned in a storage rack within the kiosk. The method furthermore comprises directing a controller in communication with a robotic mechanism located within the kiosk to cause the robotic mechanism to engage the first mattress package positioned in the storage rack and deliver the first mattress package to a product delivery area of the kiosk; and verifying completion for the order.

BRIEF DESCRIPTION OF THE DRAWINGS

The foregoing, as well as the following Detailed Description of preferred embodiments, is better understood when read in conjunction with the appended drawings. For the purposes of illustration, there is shown in the drawings exemplary embodiments; however, the presently disclosed subject matter is not limited to the specific methods and instrumentalities disclosed.

The embodiments illustrated, described, and discussed herein are illustrative of the present invention. As these embodiments of the present invention are described with reference to illustrations, various modifications or adaptations of the methods and or specific structures described may become apparent to those skilled in the art. It will be appreciated that modifications and variations are covered by the above teachings and within the scope of the appended claims without departing from the spirit and intended scope thereof. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

DETAILED DESCRIPTION

These descriptions are presented with sufficient details to provide an understanding of one or more particular embodiments of broader inventive subject matters. These descriptions expound upon and exemplify particular features of those particular embodiments without limiting the inventive subject matters to the explicitly described embodiments and features. Considerations in view of these descriptions will likely give rise to additional and similar embodiments and features without departing from the scope of the inventive subject matters. Although the term "step" may be expressly used or implied relating to features of processes or methods, no implication is made of any particular order or sequence among such expressed or implied steps unless an order or sequence is explicitly stated.

As noted earlier, when travelers are forced to sleep at an airport due to cancelled flights or due to long and/or overnight layovers, airports are typically not equipped with enough lounge chairs to accommodate all travelers that may be interested in lying down to rest. Further, under current trends, more and more travelers feel uncomfortable using such empty lounge chairs due to the concern of disease-causing microbes being present therein due to the high passenger traffic volume encountered at airports.

Embodiments of the presently disclosed subject matter can provide for a cost effective and efficient solution for travelers looking for a means to rest and/or sleep comfortably at airports and similar other locations in a hygiene manner. Embodiments of the presently disclosed subject matter can also reduce the chance of a traveler from getting infected by residual microbes present in airport furniture, when such residual microbes can be left over from prior use of the furniture by others. Embodiments of the presently disclosed subject matter provide for a disposal inflatable mattress. Embodiments of the presently disclosed subject matter further provide for a device and system for dispensing disposal inflatable mattresses.

The kiosk as mentioned herein can advantageously vend mattress packages in addition to other products stored within the kiosk. The kiosk may accept coins, paper currency and credit/debit cards. The kiosk can also accept wireless orders for mattress packages as well as wireless payments (e.g., applying near field communication (NFC) technologies) associated with orders for mattress packages. The kiosk can be placed where people gather, pass by, or wait, such as public buildings and transportation hubs including subways and airports, hospitals, schools, and similar other locations. In the kiosk as described herein, after the appropriate payment is made, and the a mattress package selected, the mattress package is dropped or delivered into a built-in bin which is accessible to the customer for retrieving the mattress package containing a disposable inflatable mattress. The kiosk can advantageously allow for the returning of an item back and thereby reversing the sale. The sale process is thus consumer friendly and upon vending the product each sale does not become final.

Under the current situation and in most cases, if an individual desires to purchase a sleeping bag, for example, the individual must either find/purchase such a sleeping bag at a convenience store, a gift shop or the like which may be placed located the waiting area of an airport. However, such point of sale premises is typically only open during limited hours of each day and require one or more people to be present to handle the purchase. Embodiments of the presently disclosed subject matter can provide for an automated checkout of mattresses and similar other items such as sleep bags and pillows—inflatable or otherwise—without the need for a salesperson to consummate the sale transaction.

Embodiments of the presently disclosed subject matter can advantageously provide for an automated vending system and device (sometimes alternately referred to herein as "kiosk") that can offer disposable inflatable mattresses at airports and similar other locations without restriction to location or hours of operation. Embodiments of the presently disclosed subject matter can accordingly advantageously overcome several of the shortcomings associated with the current state of the art by providing for the automated dispensing of disposable inflatable mattresses to various customers round the clock in an efficient manner.

Various embodiments of a system associated with the automated vending system as described herein can include a software application (alternately referred to herein as "application") for managing various aspects of the ordering and vending processes of the system as described herein, with the software application including a front-end application (also referred to herein as "front-end computing application" or "front-end mobile application") that can operate on a computing device such as a smart phone and can be viewed and manipulated by a customer. The software application can further include a back-end application (also referred to herein as "back-end computing application" or "back-end mobile application" or "back-end platform") for use by various stake holders that operate in coordination to manage the processes associated with providing inventory as well as receiving and fulfilling orders for mattress packages at various locations where the associated kiosks are positioned across the world. The application can provide customers with a front-end mobile application to order and pay for each disposable inflatable mattress that is vended. A back-end application of the system can allow for the management of the entire operation via a single platform providing an all-round view of the business environment. The back-end application can also be configured to handle all areas of the system including customer orders management, inventory management, and financials.

The kiosk can operate as a point of ordering, point of delivery, and a point of sale for customers. The kiosk as described herein can be located at various locations within airports and similar other locations including lobbies of buildings whose occupants can benefit from the use of disposable inflatable mattresses. The kiosk is configured to dispense a disposable inflatable mattress to a consumer after a payment is made at the kiosk. The kiosk is designed to serve as a point of direct sales to the end consumer.

Figure 1:
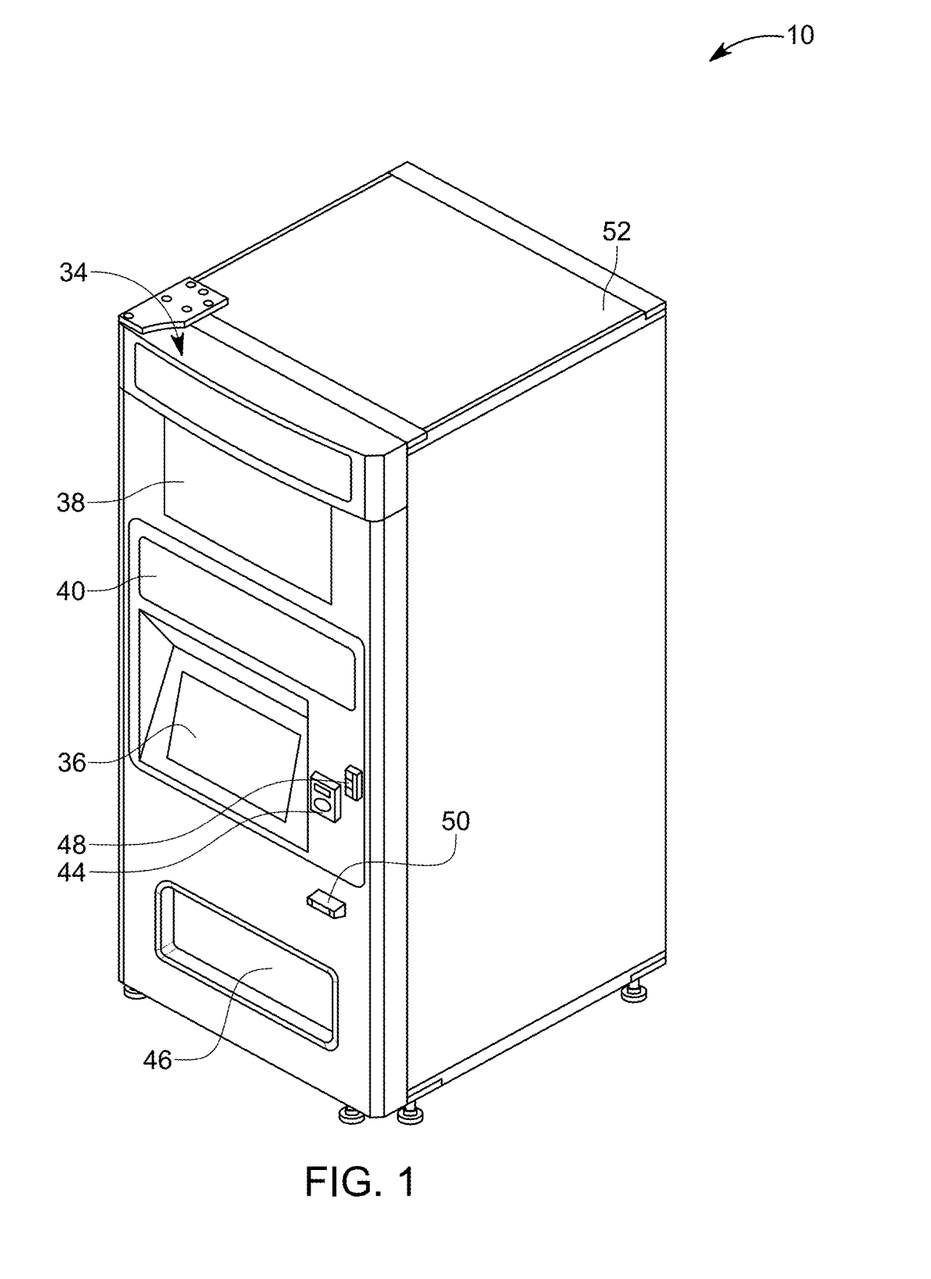
FIG. 1 illustrates a perspective view of a kiosk forming part of an automated vending system for dispensing disposable inflatable mattress packages, according to one or more embodiments of the presently disclosed subject matter.
Figure 2:
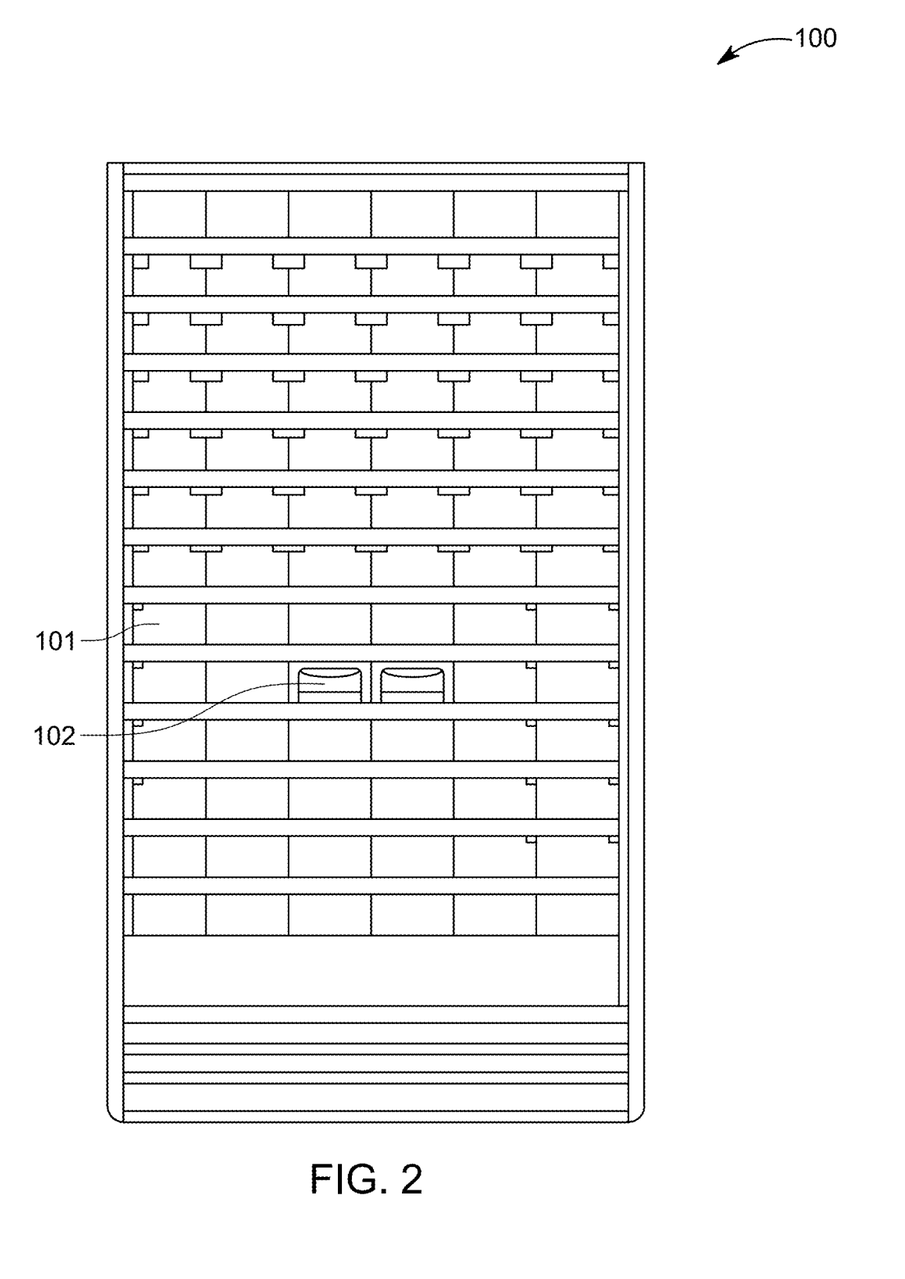
FIG. 2 illustrates a front view of a storage rack present within the kiosk of FIG. 1, according to one or more embodiments of the presently disclosed subject matter.

Referring now to the drawings and particularly FIGS. 1 and 2, one embodiment of the vending kiosk according to the presently disclosed subject matter is illustrated. Generally, the illustrated kiosk 10 includes a cabinet assembly or housing defining a product holding area storage rack 100 provided within the kiosk 10 that contains a plurality of product holders in the form of slots 101, ceiling 52, a plurality of product sensors to track loading and dispensing of mattress packages 102, a door 34 attached to the housing 22, a user interface 36 in the door 34, an illuminated physical product display area 40 in door 34, a imaging device 38, a payment receiver 44 in door 34, a product delivery area 46 in door 34, a receipt distributor 50 in door 34, a lock assembly 48 configured to lock door 34 to housing 22. In various embodiments, imaging device 38 can be a QR code reader, a RFID reader, a scanner, or any other similar imaging device.

According to various embodiments of the presently disclosed subject matter, an automated vending device or system for disposable inflatable mattresses comprises a kiosk 10 for housing a plurality of mattress packages 102, each mattress package 102 including a disposable inflatable mattress 200 with an inflating means. The plurality of mattress packages 102 are positioned in a storage rack 100 within the kiosk 10. A robotic mechanism is configured to engage a first mattress package from the storage rack and deliver the first mattress package to a product delivery area of the kiosk. In various embodiments, the robotic mechanism can be based any commonly known technologies used in the art as a person of skill in the art readily understands. For example, in one embodiment, the robotic mechanism can be a robotic arm configured to move back and forth along a channel extending within the kiosk for retrieving mattress packages onto or from the storage rack. The robotic mechanism can be controlled by a kiosk controller operating on the kiosk. In various embodiments, the kiosk controller is in communication with a central server. The robotic mechanism can include a QR code reader, a bar code reader or similar other scanning or imaging device. In some embodiments, the robotic mechanism can be in the form of product holder that is configured to rotate or revolve to allow just one mattress package to be dropped to the product delivery area of the kiosk per order; this setup is similar to what is found in typical snack dispenser kiosks commonly available in lobbies of office buildings, for example. In some embodiments, the kiosk can carry other items such as sleeping bags and pillows, in addition to other rest/sleep related items.

Kiosk 10 can further include a user interface 36 configured for receiving a user selection of the first mattress package. The kiosk can also include a controller that is configured for commanding the robotic mechanism to select and deliver the first mattress package to the product delivery area based on and/or in response to an order received from a user at user interface 36. In some embodiments, the user interface 36 can be located on an outer surface of the kiosk. In some embodiments, the user interface can be in the form of LED screen.

According to various embodiments of the presently disclosed subject matter, the system allows a customer to order and pay for a mattress package carried within the kiosk through an application running on a mobile device associated with the customer. According to at least one embodiment, a controller of the system that is in communication with the mobile application receives the customer order and processes the customer order and retrieves the ordered mattress package. A server forming part of the system operates to communicate with various components of the system—including the kiosk—wirelessly or through a wired connection.

Kiosk 10 as illustrated, for example, in FIG. 1 is configured for housing a plurality of mattress packages, each mattress package deliverable on receipt of an order from a customer with the plurality of mattress packages positioned in storage rack positioned within kiosk 10. In various embodiments, the system can further comprise a server. The server can include a processor and program instructions for execution by the processor. Program instructions executed by the processor can cause the processor to receive, on a user interface, a selection of a first mattress package. The program instructions executed by the processor can further cause the processor to direct the controller in communication with a robotic mechanism located within the kiosk to cause the robotic mechanism to engage the first mattress package at the storage rack and deliver the first mattress package to a product delivery area of the kiosk; and verify completion for the order. In various embodiments, as part of engaging the first mattress package at the storage rack, an imaging device coupled to the robotic mechanism reads an identifier on the first mattress package. In some embodiments, the step of the controller causing the robotic mechanism to engage the first mattress package further includes a lookup of a stocking location (on the storage rack) associated with the identifier of the first mattress package by the controller and communication of the stocking location to the robotic mechanism.

The program instructions can be executed at one or more of the central server and the controller, wherein the controller is coupled to, or otherwise forms an integral part of, the kiosk 10. In one embodiment, the program instructions can also be executed at a processor of the system, wherein the system and/or the kiosk includes its own computing device. Accordingly, in some embodiments, the system/kiosk includes a processor, memory and a wireless transceiver. In some embodiments, the server is configured to communicate with the controller and the system via a wireless network. In some embodiments, the server is configured to communicate with a mobile application such as a front-end application operating on a mobile device associated with the customer in order to complete an order for a mattress package. In some embodiments, the controller can be a digital controller that includes a processor, memory and a wireless transceiver, among other components.

Referring to FIG. 2, a portion of the front facing side of storage rack is shown. As shown in FIG. 2, storage rack 100 includes a plurality of slots 101 for receiving and holding mattress packages 102. In one embodiment, each slot 101 is configured for conveniently receiving mattress packages 102 and retaining them for a robotic mechanism to pick them up and deliver at a product delivery area 46 of the kiosk for retrieval by a customer associated with the mattress package. The slots 101 are configured to accommodate mattress packages of different sizes. Whereas storage rack 100 includes a plurality of mattress packages 102 stored therein, only two of them are shown in FIG. 2. In some embodiments, storage rack 100 can also carry other items that passengers at an airport may be interested in purchasing.

In various embodiments, kiosk 10 can further include a computer control system (including a processor and/or a server) configured to control and manage the operation and various components of the kiosk 10 via the kiosk controller as mentioned herein. The processor is electrically coupled to a communication device through which the processor communicates, in accordance with certain embodiments, with other devices such as one or more peripheral devices, one or more servers, and/or one or more user devices, as discussed in detail below. In some embodiments, the system further comprises a server in communication with the kiosk controller for coordinating delivery of the first mattress package to the product delivery area. In one embodiment, the system is positioned within a passenger waiting area of an airport.

Embodiments of the presently disclosed subject matter provide for a disposable inflatable mattress that is contained in each mattress package 102. The mattress can be disposed of after a single use. One or more quick air release valves can be provided in each mattress for the quick deflation of the mattress once the mattress is ready for disposal. While the mattress is designed for being disposed after a single use or after a few uses, the mattress can be constructed of sturdy and resilient construction to allow it stay inflated after several repeated inflations and deflations. In one embodiment, the mattress as described herein is recyclable, and accordingly environment friendly.

In various embodiments, the kiosk 10 in configured to receive and process a payment associated with the first mattress package prior to the first mattress package being delivered to the product delivery area of kiosk 10. In various embodiments, first mattress package can include one or more of mattress 200, mattress 300 and mattress 400 as described below.

Figure 3:
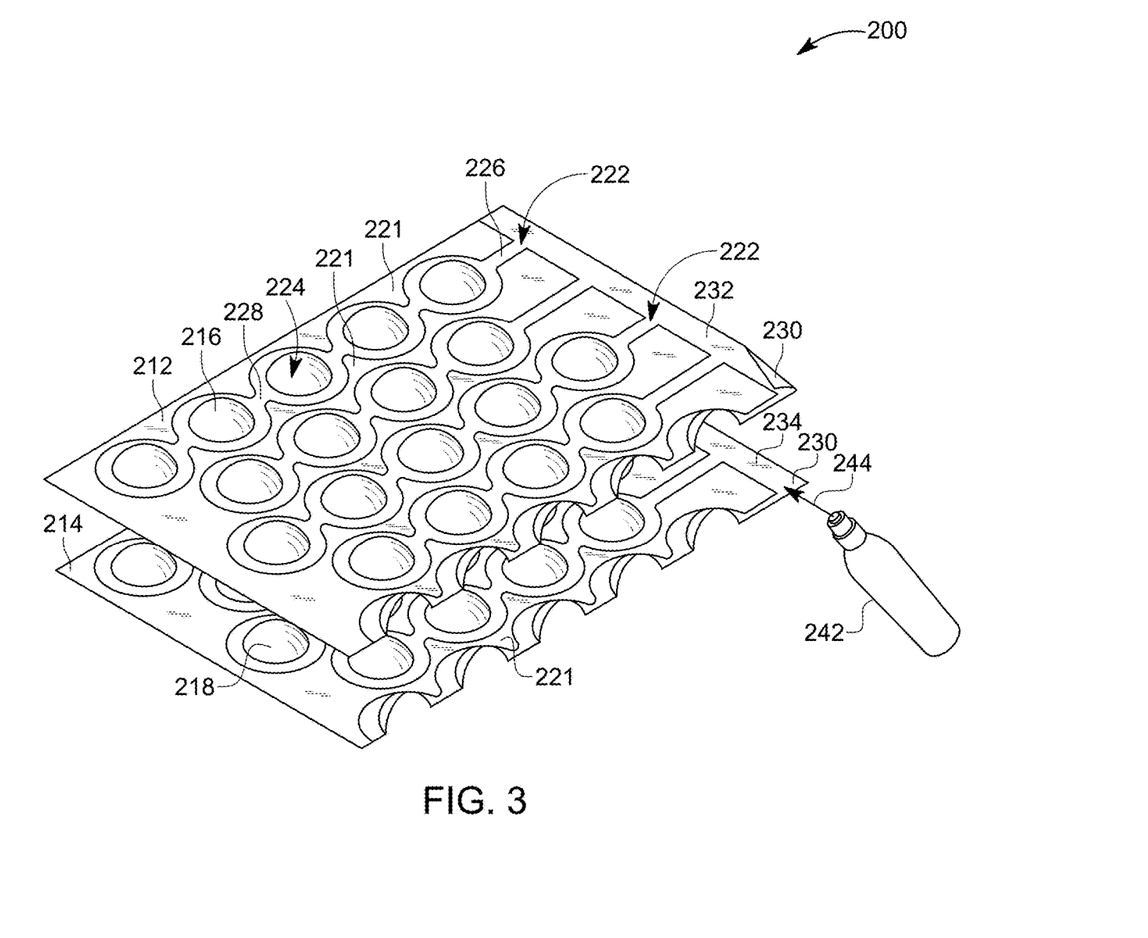
FIG. 3 is an exploded perspective cut-away view of a disposable inflatable mattress, according to one or more embodiments of the presently disclosed subject matter.

Referring to FIG. 3, in at least one embodiment, mattress 200 includes a first film 212, a second film 214, the first and second films joined together as a web in a pattern of seal lines in the form of bonded regions 221, wherein the pattern of seal lines form one or more inflation channels 226 extending linearly along a length of the sheets for receiving pressurized air from an outlet end of an air inflation tube 244 disposed within the inflation channels 226. In at least one embodiment, mattress 200 includes an inflating means that comprises a self-contained compressed air cylinder 242 that may be in the form of a canister or similar other compressed air container. Air cylinder 242 can operate to fill mattress 200 via an air inflation tube 244 that is fluid communication with both air cylinder 242 and one or more air channels of mattress 200. In some embodiments, the inflating means can be in the form of a battery-operated air pump wherein the battery-operated air pump operates to pump air via air inflation tube 244 into one or more air channels of mattress 200. In some embodiments, the inflating means can be in the form of an air pump operable with a utility power source wherein the air pump operable with a utility power source operates to pump air via an air inflation tube 244 into one or more air channels of mattress 200. In various embodiments, mattress 200 is further provided by a means for inflating with a human mouth. For example, in one embodiment, mattress 200 is provided with a self-closing valve similar to what is provided in inflatable children toys for the purpose of inflating inflatable mattress 200 with a human mouth, a hand pump, a balloon inflating pump and similar other inflation mechanisms.

In one embodiment, mattress 200 has a plurality of inflatable cells 224 comprising formed regions 216 in first film 212 and formed regions 218 in second film 214. First film 212 and second film 214 are not bonded to one another in formed regions 216 and 218. Formed regions 218 in second film 214 are nested within the respective cavities of formed regions 216 of first film 212. Each inflatable cell of the plurality of inflatable cells includes a formed region of the second film nested within a corresponding formed region of the first film. First film 212 and second film 214 are sealed together in bonded region 221. The edges of bonded region 221 are shaped, sized, and located to define each of the inflatable chambers of mattress 200 as well as the inflation fluid entrance ports 222 and inflation channels 226.

Each of the inflatable chambers of mattress 200 includes inflatable inflation channel 226, a plurality of inflatable cells 224, and a plurality of inflatable connecting channels 228. The regions of first film 212 and second film 214 which make up inflation channels 226 and connecting channels 228 may be flat, i.e., unformed, as illustrated in FIG. 3, or may be formed and nested with one another, i.e., in a manner not illustrated but corresponding with the nesting of formed regions 216 and 218. Inflation channels 226 extend from open skirt 230 formed by unbonded film side edge regions 232 and 234. Bonded region 221 present between adjacent inflatable chambers are actually one continuous sealed region, as bonded region 221 extends continuously along the length of a longitudinal edge of mattress 200. The portions of bonded region 221 which are between adjacent inflatable chambers, in combination with that portion of bonded region 221 along the longitudinal edge, define the boundaries of each inflatable chamber. As can be seen in FIG. 3, bonded region 221 can have a repeating pattern. Bonded region 221 can be made using heat and pressure to cause a bond between the inner surfaces of first film 212 and second film 214. Alternatively, first film 212 and second film 214 can be adhesively bonded to each other.

In some embodiments, the first film can have a unit weight of from 20 to 250 grams per square meter and the second film can have a unit weight of from 20 to 250 grams per square meter. In some embodiments, the first film has a thickness of from about 0.5 to about 60 mils and the second film has a thickness of from about 0.5 to about 60 mils. In some embodiments, the mattress 200 includes a closed inflation manifold running the length of the article. The closed inflation manifold extends along a first edge of the mattress 200, with a plurality of inflatable chambers extending from the inflation manifold across the inflatable article. In some embodiments, a plurality of inflatable chambers extends from a first side of the inflation manifold and a plurality of inflatable chambers extends from a second side of the inflation manifold, with the inflatable chambers which extend from the first side of the inflation manifold extending across the mattress 200 towards a first side edge of the mattress 200, and the inflatable chambers which extend from the second side of the inflation manifold extending across the mattress 200 towards a second side edge of the mattress 200. In some embodiments, each of the inflatable chambers contains from 2 to 20 cells. In some embodiments, the first film is a multilayer film and the second film is a multilayer film.

Accordingly, in various embodiments, the mattress as described herein can comprise a first film bonded to a second film so as to provide a plurality of inflatable chambers comprising a plurality of cells between the first film and the second film, wherein each of the cells is connected to at least one adjacent cell by an inflatable connecting channel.

In various embodiments, the first and second films comprise a polyolefin, such as for example a low density polyethylene, a homogeneous ethylene/alpha-olefin copolymer, a medium density polyethylene, a high density polyethylene, a polyethylene terapthalate, polypropylene, nylon, polyvinylidene chloride, polyvinyl alcohol, polyamide, or combinations thereof.

If desired or necessary, various additives can also be included with the films. For example, additives comprise pigments, colorants, fillers, antioxidants, flame retardants, anti-bacterial agents, anti-static agents, stabilizers, fragrances, odor masking agents, anti-blocking agents, slip agents, and the like. Thus, the present invention encompasses employing suitable film constituents.

In one embodiment, films 212 and 214 comprise thermoplastic films. In at least one embodiment, the thermoplastic film comprises at least two olefin based polymer layers. In one embodiment, at least one of the olefin based polymer layers comprises a high molecular weight siloxane polymer. In one embodiment the mattress is constructed of a thermoplastic polymeric film, wherein the thermoplastic film comprises a major amount of an ethylene based polymer. In one embodiment, films 212 and 214 are constructed of a thermoplastic polymeric film.

In various embodiments, mattress 200 is configured to be as thin as possible, in order to minimize the amount of resin necessary to fabricate mattress 200, but at the same time are thick enough to provide adequate durability. Preferably, each of first and second films of mattress 300 have a gauge thickness of from about 0.1 to about 200 mils. More preferably, each film layer has a total gauge thickness from about 0.5 to about 10 mils, more preferably from about 0.8 to about 40 mils, and even more preferably from about 1.0 to about 30 mils.

Mattress 200 is configured to be versatile and goes from small package contained within mattress package 102 to a full-size inflated mattress within a short time period. Mattress 200 is provided with valves with extra-wide openings for fast inflation and deflation. In some embodiments, mattress package 102 carrying mattress 200 further includes an air pump. It includes waterproof top surfaces that are soft to the touch and tough enough for outdoor use. Mattress 200 can be conveniently used to sleep or take a nap, or to just relax and read a magazine. Mattress 200 can be advantageously configured for lounging around and sleeping. In one embodiment, it is configured for holding up to 300 pounds. If desired, after deflation, mattress 200 can be packed away and re-used. Mattress 200 can be provided with valves for easy deflation.

Figure 4:
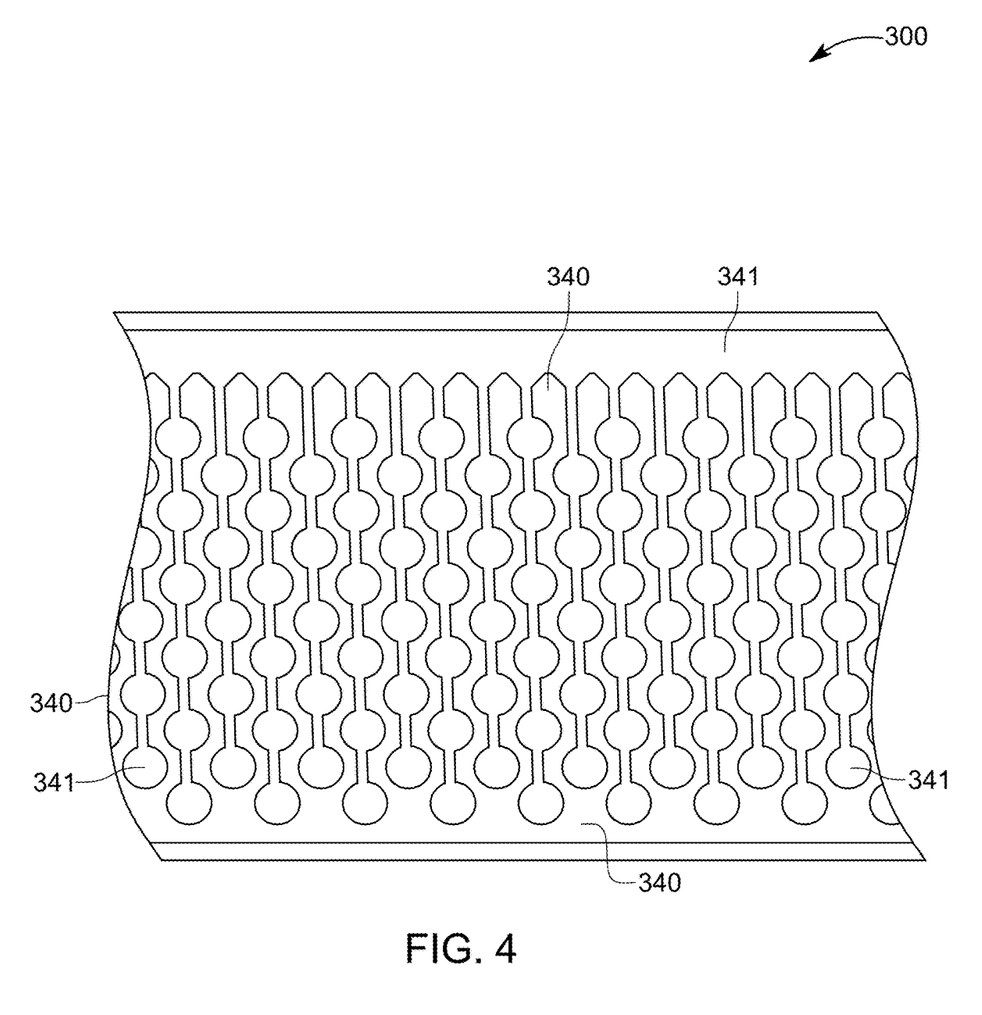
FIG. 4 is a top view of a section of a disposable inflatable mattress, according to one or more embodiments of the presently disclosed subject matter.

FIG. 4 is a schematic view of another embodiment of a mattress, according to one or more embodiments of the presently disclosed subject matter. In FIG. 4, mattress 300 comprises a sealed portion 340, as well as unsealed portion 341. Sealed portion 340 is continuous along the machine direction of mattress 300, with sealed portion 340 corresponding to a preferred raised surface pattern. Unsealed portion 341 is also continuous along the machine direction of mattress 300, with unsealed portion 341 corresponding to a preferred recessed surface pattern (i.e., background pattern). Unsealed portion 341 is arranged to form a pattern that includes distinct air chambers, connecting channels, as well as leaving a skirt (i.e., film flaps) for use in inflating the mattress 300. Optionally, the unsealed portion could further include a passageway in the machine direction which serves as a manifold, i.e. connecting each of the passageways along an edge of the article. In one embodiment, the inflatable chambers have an uninflated diameter of about 1.5 inches to 5 inches and the passageways connecting the inflatable chambers have an uninflated width of about 0.5 inches to 2 inches, and the seals are made so that the edges of the inflatable chambers and passageways are free of inflection points which can produce unwanted stresses during inflation and use of the product. Mattress 300 may otherwise comprise the same or similar features as mattress 200.

Figure 5:
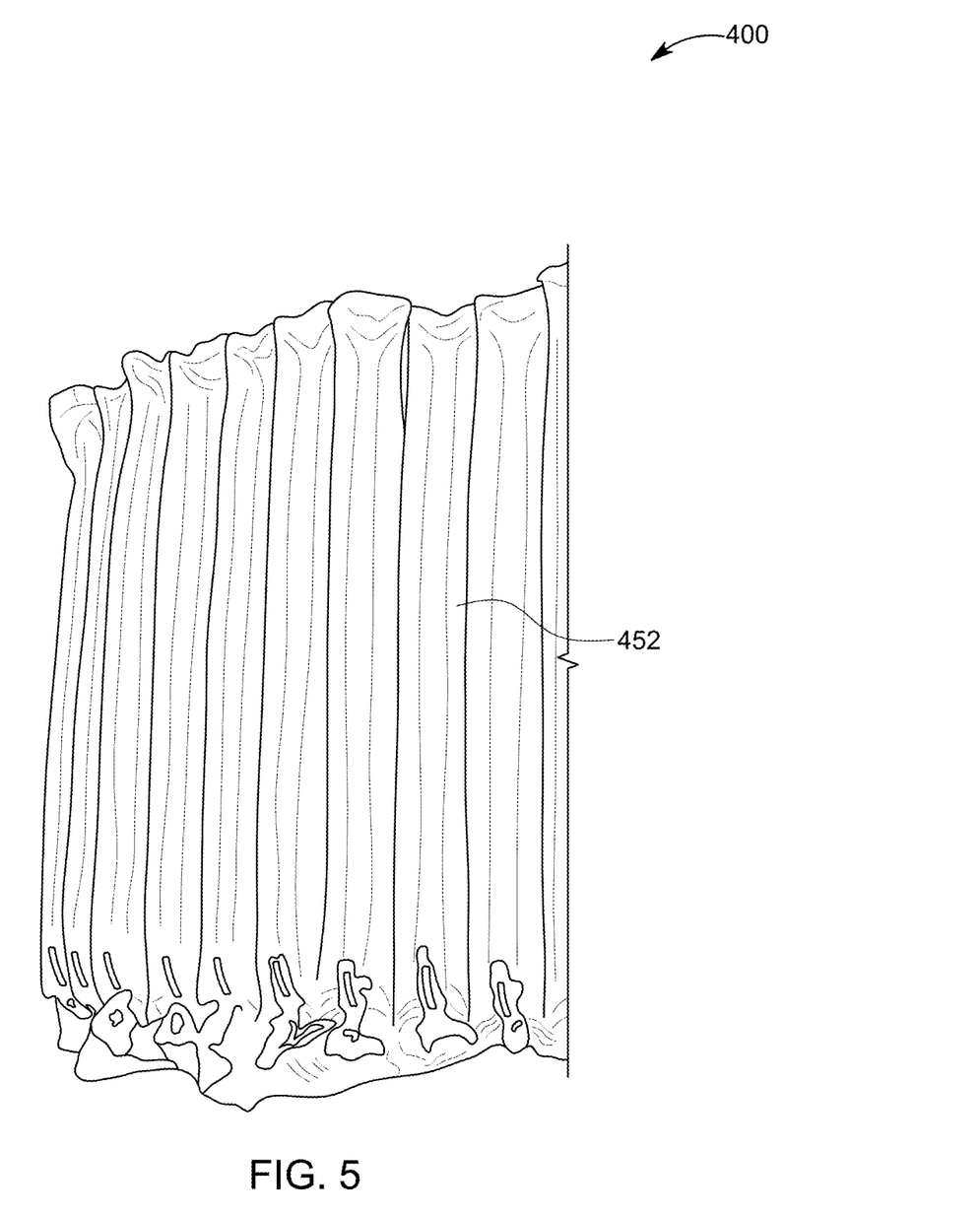
FIG. 5 is a perspective view of a section of a disposable inflatable mattress, according to one or more embodiments of the presently disclosed subject matter.

FIG. 5 is a perspective view of another embodiment of a mattress, according to one or more embodiments of the presently disclosed subject matter. In FIG. 5, mattress 400 comprises a series of interconnected inflatable strips 452 arranged to form a pattern that includes distinct air chambers. Interconnected inflatable strips 452 can comprise a plurality of stripe-shaped chambers, wherein each stripe-shaped chamber is interconnected to an adjacent stripe-shaped chamber by an interconnecting passageway. In some embodiments, connecting channels are provided for inflating the strips 452 through the interconnecting passageway with an inflating means such as, for example, a self-contained compressed air cylinder. The pattern of seal lines in the form of bonded regions found in mattress 400 can form a plurality of individual inflatable strips of multiple bubble cushioning structures extending laterally from an inflation channel provided, for example, on side regions of mattress 400.

In at least one embodiment, each individual inflatable strip 452 can include a plurality of bubble chambers with each bubble chamber interconnected to an adjacent bubble chamber by an interconnecting passageway which is smaller in size and internal volume than the bubble chambers but which is sufficiently large to enable air volume and pressure in one inflated bubble chamber to be transmitted to adjacent bubble chambers for distributing a shock load on one bubble chamber along the entire length of the individual inflatable strip of interconnected bubble chambers. Each individual inflatable strip of multiple bubble cushioning structures can have an entrance port connecting the first bubble chamber in the strip to the inflation channel for receiving pressurized air at the inflation station to inflate all of the bubble chambers in the individual inflatable strip. Mattress 400 may otherwise comprise the same or similar features as mattress 200.

Figure 6:
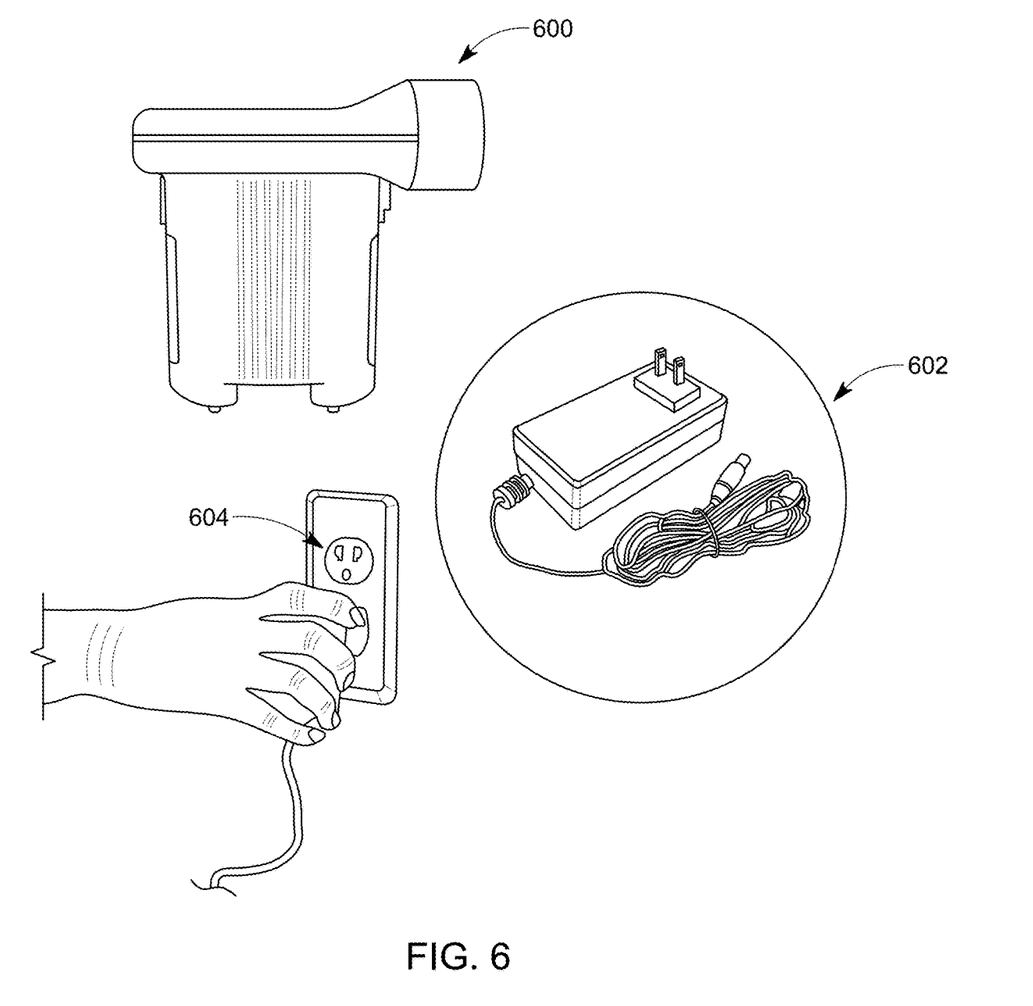
FIG. 6 is a perspective view of an air pump and associated features for inflating a disposable inflatable mattress, according to one or more embodiments of the presently disclosed subject matter.

As illustrated in FIG. 6, the system or device can further include an air pump 600. In various embodiments, the air pump 600 can include chamber that houses one or more batteries for inflating an inflatable mattress such as mattress 200. In one embodiment, air pump 600—in addition to or in lieu of batteries—can be configured to be operated by a utility power source such as a utility power outlet 604; in such an embodiment, the device can further include a power cord such as power cord 602 for connecting air pump 600 to a utility power outlet 604. In one embodiment, air pump 600 that is operable by a utility power source is further provided with a A/C to D/C convertor wherein the pump/blower within air pump 600 operates on D/C power.

Embodiments of the presently disclosed subject matter can further include a central server (alternately referred to herein as "server"). According to various embodiments of the presently disclosed subject matter, the server can include a processor communicably coupled to at least one memory. The server can further include program instructions (for e.g., in the form of a computer application) which when executed by the processor can cause the processor to receive, at a user interface of the kiosk 10, an order for a first mattress package. In one embodiment, the order can instead be received at a mobile device such as a smart phone, for example, operated by a customer. In one embodiment, the processor communicates with a controller, such as the controller present in, or otherwise coupled to, kiosk 10. In one embodiment, one or more modules of a back-end application operating on the controller can be in communication with a back-end application operating on the server. In some embodiments, either the server or the controller of kiosk 10 is further configured to process a payment associated with the order. In other words, the server or controller can allow a customer to place an order for a mattress package and make a payment via a front-end application (also referred to herein as the "front-end platform" or "mobile application") operating on the customer's computing device. After the server receives the order and the payment for the order, the server or controller can coordinate the dispensing of a mattress package.

The various components of the system according to the exemplary embodiments may be embodied in a program command form which may be executed through various computer units and recorded in computer-readable media. The computer-readable media may contain program commands, data files, data structures, and combinations thereof. The program commands recorded in the medium may be specially designed for the exemplary embodiments. Alternatively, the program commands may be well-known by those skilled in computer software. The computer-readable media may include hardware devices specially configured to store and execute program commands. For example, magnetic media, such as a hard disk, a floppy disk and a magnetic tape, optical media, such as a CD-ROM and a DVD, a magneto-optical media, such as a floptical disk, a ROM, a RAM and a flash memory may be used as the computer-readable media. The program commands may include a machine language prepared by a compiler and a high-level language code prepared by an interpreter so as to be executed by a computer. The above-mentioned hardware devices may be configured to operate as one or more software modules to operate the exemplary embodiments and vice versa.

Accordingly, in various embodiments, the server comprises a processor communicably coupled to at least one memory, and program instructions that can be executed by the processor. The program instructions when executed by the processor can cause the processor to receive, from a computing device, an order for a first mattress package. The server is further configured to locate position of a first mattress package in a storage rack within a vending kiosk, the kiosk configured for housing a plurality of mattress packages, each mattress package including a disposable inflatable mattress with an inflating means, the plurality of mattress packages positioned in a storage rack within the kiosk. The server is furthermore configured to receive, on a user interface, a selection of the first mattress package by a user. The server is also configured to direct a controller in communication with a robotic mechanism located within the kiosk to cause the robotic mechanism to engage the first mattress package at the storage rack and deliver the first mattress package to a product delivery area of the kiosk; and verify completion for the order.

In various embodiments, the server is configured to communicate with a mobile application operating on a mobile device associated with the user. In various embodiments, the server is further configured to process a payment associated with the order.

In various embodiments, the server is configured to include one or more of a data center supporting a network device for vending mattress packages to customers from a plurality of kiosks, each kiosk comprising a computing device and an interface for communicating with the data center over the network device. The data center comprises one or more data stores for storing inventory information corresponding to mattress packages in the plurality of kiosks, one or more modules for receiving the inventory information from the plurality of kiosks and processing the inventory information to control inventory in the plurality of kiosks, and a network interface for connecting to the network device. The data center is configured to connect to network interfaces of the plurality of kiosks over a network.

In some embodiments, a kiosk as disclosed herein can be located within an airport or hotel lounge. The system and method as disclosed herein may include built-in security features such as cameras, infra-red or similar other scanners, and similar other security features to identify any tampering with the kiosk or with the mattress packages. Embodiments of the presently disclosed subject matter can accordingly provide an automated kiosk with the ability to store and deliver mattress packages to customers.

Embodiments of the presently disclosed subject matter further include a method. In at least one embodiment, the method comprises receiving, from a computing device, an order for a first mattress package. The method further comprises locating position of a first mattress package in a storage rack within a vending kiosk, the kiosk configured for housing a plurality of mattress packages, each mattress package including a disposable inflatable mattress with an inflating means, the plurality of mattress packages positioned in a storage rack within the kiosk. The method also includes receiving, on a user interface, a selection of the first mattress package by a user. The method additionally includes directing a controller in communication with a robotic mechanism located within the kiosk to cause the robotic mechanism to engage the first mattress package at the storage rack and deliver the first mattress package to a product delivery area of the kiosk. The method furthermore includes verifying completion for the order.

In some embodiments, the method further comprises communicating with a mobile application operating on a mobile device associated with the user. In some embodiments, the method additionally comprises processing a payment associated with the order. In at least one embodiment, the method also includes verifying completion for the order. The verification can be done either by the server or by the controller. The method can also include processing a payment associated with the order prior to the first mattress package being dispensed.

Whereas the embodiments of the mattresses as described herein are described in conjunction with an automated vending system, the mattresses can also be distributed and dispensed without the use of a kiosk. For example, the disposable inflatable mattresses can be distributed in bulk in boxes and packages as part of disaster relief efforts. For example, the disposable inflatable mattresses can be distributed by an organization such as, for example, the Red Cross to people in areas hit by natural disasters or calamities. The disposable inflatable mattresses as described herein can also be used in hospitals when they run out of beds when there is a sudden surge in patient intake resulting, for example, from an explosion, a disease outbreak, a virus outbreak, a bacterial outbreak, a microbe related outbreak, a pollution related incident, a radioactivity related incident, a war related incident, and any other similar situations. In some further embodiments, the mattresses can be made available without a mattress package. In some embodiments, the mattress package is configured for being dropped from a helicopter or an aircraft into areas in need of temporary beddings, for example.

Accordingly, in at least one embodiment, a disposable inflatable mattress package comprises a disposable inflatable mattress with an inflating means, wherein the disposable inflatable mattress is configured for single use. In some embodiments, the inflating means comprises a self-contained compressed air cylinder. In some embodiments, the inflating means comprises a battery-operated air pump or an air pump operable with a utility power source.

Although a few exemplary embodiments have been shown and described, it would be appreciated by those skilled in the art that changes may be made in these exemplary embodiments without departing from the principles and spirit of the invention, the scope of which is defined in the claims and their equivalents.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium (including, but not limited to, non-transitory computer readable storage media). A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter situation scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Any dimensions expressed or implied in the drawings and these descriptions are provided for exemplary purposes. Thus, not all embodiments within the scope of the drawings and these descriptions are made according to such exemplary dimensions. The drawings are not made necessarily to scale. Thus, not all embodiments within the scope of the drawings and these descriptions are made according to the apparent scale of the drawings with regard to relative dimensions in the drawings. However, for each drawing, at least one embodiment is made according to the apparent relative scale of the drawing.

Unless defined otherwise, all technical and scientific terms used herein have the same meaning as commonly understood to one of ordinary skill in the art to which the presently disclosed subject matter pertains. Although any methods, devices, and materials similar or equivalent to those described herein can be used in the practice or testing of the presently disclosed subject matter, representative methods, devices, and materials are now described.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise indicated, all numbers expressing quantities of components, conditions, and so forth used in the specification and claims are to be understood as being modified in all instances by the term "about". Accordingly, unless indicated to the contrary, the numerical parameters set forth in the instant specification and attached claims are approximations that can vary depending upon the desired properties sought to be obtained by the presently disclosed subject matter.

As used herein, the term "about", when referring to a value or to an amount of mass, weight, time, volume, concentration, and/or percentage can encompass variations of, in some embodiments +/−20%, in some embodiments +/−10%, in some embodiments +/−5%, in some embodiments +/−1%, in some embodiments +/−0.5%, and in some embodiments +/−0.1%, from the specified amount, as such variations are appropriate in the presently disclosed subject matter.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

These and other changes can be made to the disclosure in light of the Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

What is claimed is:

1. An automated vending system for dispensing disposable inflatable mattresses, comprising:
   a kiosk for housing a plurality of mattress packages, each mattress package including a disposable inflatable mattress with an inflating means, the plurality of mattress packages positioned in a storage rack within the kiosk;
   a robotic mechanism configured to engage a first mattress package from the storage rack and deliver the first mattress package to a product delivery area of the kiosk;
   a user interface configured for receiving a user selection of the first mattress package; and
   a controller configured to command the robotic mechanism to select and deliver the first mattress package to the product delivery area;
   wherein the disposable inflatable mattress includes an inflation tube, a first film, and a second film;
   wherein the first film and the second film are joined together to define a plurality of inflatable chambers, wherein each inflatable chamber of the plurality of inflatable chambers includes a plurality of inflatable cells and a plurality of inflatable connecting channels;
   wherein the inflation tube is in fluid communication with the plurality of inflatable chambers;
   wherein each inflatable cell of the plurality of inflatable cells comprises a first formed region in the first film and a second formed region in the second film, wherein the first formed region includes a cavity for receiving the second formed region of the second film, wherein the second formed region of the second film nests in the first formed region in the first film; and
   wherein at least two inflatable chambers of the plurality of inflatable chambers have different lengths.

2. The system of claim 1, wherein a payment associated with the first mattress package is received prior to the first mattress package being delivered to the product delivery area.

3. The system of claim 1, wherein the inflating means comprises a self-contained compressed air cylinder.

4. The system of claim 1, wherein the inflating means comprises a battery-operated air pump.

5. The system of claim 1, wherein the inflating means comprises an air pump operable with a utility power source.

6. The system of claim 1, wherein the first film and the second film each comprise a thermoplastic film, wherein the thermoplastic film comprises at least two olefin-based polymer layers.

7. The system of claim 1, wherein the system is positioned within a passenger waiting area of an airport.

8. The system of claim 1, wherein the kiosk further includes a plurality of product sensors and an imaging device coupled to the robot mechanism, wherein the plurality of product sensors is configured to track the loading and unloading of the plurality of mattress packages, wherein the imaging device is configured to read an identifier on the first mattress package, wherein the plurality of mattress packages includes at least two mattress packages of different sizes.

9. The system of claim 1, further including a plurality of entrance ports, wherein each inflatable chamber of the plurality of inflatable chambers is connected to an entrance port of the plurality of entrance ports, wherein the plurality of inflatable chambers is configured to receive fluid from the inflation tube via a corresponding entrance port, wherein the inflation tube is positioned along a side of the disposable inflatable mattress, wherein the inflation tube is connected to each entrance port of the plurality of entrance ports on a first side of the inflation tube.

10. The system of claim 1, wherein at least two inflatable chambers of the plurality of inflatable chambers include a different number of inflatable cells.

11. The system of claim 1, wherein the system further comprises a server in communication with the controller for coordinating delivery of the first mattress package to the product delivery area.

12. The system of claim 1, wherein each inflatable cell of the plurality of inflatable cells is connected to at least one adjacent cell by at least one inflatable connecting channel of the plurality of inflatable connecting channels.

13. The system of claim 1, wherein the first film and the second film are joined together as a web in a pattern of seal lines, wherein the pattern of seal lines form a plurality of inflation channels extending linearly along a length of the disposable inflatable mattress, wherein the plurality of inflation channels is configured to receive pressurized air from the inflation tube.

14. A server, comprising:
   a processor communicably coupled to at least one memory; and program instructions which when executed by the processor cause the processor to:
   receive, on a user interface of a vending kiosk, an order for a first mattress package by a user, wherein the kiosk is configured for housing a plurality of mattress packages, each mattress package including a disposable inflatable mattress with an inflating means, wherein the disposable inflatable mattress includes an inflation tube, a first film, and a second film, wherein the first film and the second film are joined together to define a plurality of inflatable chambers, wherein each inflatable chamber of the plurality of inflatable chambers includes a plurality of inflatable cells and a plurality of inflatable connecting channels, wherein the inflation tube is in fluid communication with the plurality of inflatable chambers, wherein each inflatable cell of the plurality of inflatable cells comprises a first formed region in the first film and a second formed region in the second film, wherein the first formed region includes a cavity for receiving the second formed region of the second film, wherein the second formed region of the second film nests in the first formed region in the first film, the plurality of mattress packages positioned in a storage rack within the kiosk;
   locate position of a first mattress package in a storage rack within the kiosk;
   direct a controller in communication with a robotic mechanism located within the kiosk to cause the robotic mechanism to engage the first mattress package at the storage rack, wherein an imaging device coupled to the robot mechanism is configured to read an identifier on the first mattress package, and deliver the first mattress package to a product delivery area of the kiosk; and
   verify completion of the order.

15. The server of claim 14, wherein the server is configured to communicate with a mobile application operating on a mobile device associated with the user.

16. The server of claim 14, wherein the server is further configured to process a payment associated with the order.

17. The server of claim 14, wherein the server is further configured to communicate with a mobile application operating on a mobile device associated with the user.

18. A disposable inflatable mattress package, comprising:
   a disposable inflatable mattress comprising an inflation tube, a first film, a second film, and an inflating means;
   wherein the first film and the second film are joined together as a web in a pattern of seal lines, wherein the pattern of seal lines form a plurality of inflation channels extending linearly along a length of the mattress, wherein the plurality of inflation channels are configured to receive pressurized air from the inflation tube;
   wherein the first film and the second film form a plurality of inflatable chambers, wherein each inflatable chamber of the plurality of inflatable chambers includes a plurality of inflatable cells and a plurality of inflatable connecting channels;
   wherein the inflation tube is in fluid communication with the plurality of inflatable chambers via the plurality of inflation channels;
   and
   wherein each inflatable cell of the plurality of inflatable cells comprises a first formed region in the first film and a second formed region in the second film, wherein the first formed region includes a cavity for receiving the second formed region of the second film, wherein the second formed region of the second film nests in the first formed region in the first film.

19. The system of claim 18, wherein the inflating means comprises a self-contained compressed air cylinder.

20. The system of claim 18, wherein the inflating means comprises a battery-operated air pump or an air pump operable with a utility power source.

* * * * *